(12) United States Patent
Zhang et al.

(10) Patent No.: US 9,148,198 B1
(45) Date of Patent: Sep. 29, 2015

(54) PROGRAMMABLE PRE-EMPHASIS CIRCUIT FOR MIPI C-PHY

(71) Applicant: QUALCOMM Incorporated, San Diego, CA (US)

(72) Inventors: Le Zhang, Shanghai (CN); Chulkyu Lee, San Diego, CA (US); Wenjun Su, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/284,293

(22) Filed: May 21, 2014

(51) Int. Cl.
*H04L 27/00* (2006.01)
*H04B 3/04* (2006.01)

(52) U.S. Cl.
CPC .................................. *H04B 3/04* (2013.01)

(58) Field of Classification Search
CPC ............ H04L 25/4902; H04L 25/0272; H04L 25/4917; H04L 2025/03363; H04L 27/18; H04L 25/4925; H04L 27/1563; H04L 7/033; H03K 3/356034; Y02B 60/1235; G11C 7/106; G11C 7/1084; H04B 3/04; H04W 52/241
USPC ......... 375/295, 259, 353, 364, 286, 332, 238, 375/242, 244; 341/57, 67, 68; 327/57
See application file for complete search history.

(56) References Cited

U.S. PATENT DOCUMENTS

| | | | |
|---|---|---|---|
| 7,919,984 | B2 | 4/2011 | Balamurugan et al. |
| 8,198,912 | B1 | 6/2012 | Thinakaran et al. |
| 8,208,578 | B2 | 6/2012 | Franzon et al. |
| 8,630,369 | B2 | 1/2014 | Tsunoda |
| 8,718,184 | B1 | 5/2014 | Cronie et al. |
| 2008/0212709 | A1* | 9/2008 | Wiley ........................... 375/286 |
| 2014/0006649 | A1 | 1/2014 | Wiley et al. |
| 2014/0112401 | A1 | 4/2014 | Wiley et al. |

FOREIGN PATENT DOCUMENTS

EP 2375662 A1 10/2011
WO WO-2015021257 2/2015

OTHER PUBLICATIONS

International Search Report and Written Opinion—PCT/US2015/031815—ISA/EPO—Jul. 16, 2015.

* cited by examiner

*Primary Examiner* — Rahel Guarino
(74) *Attorney, Agent, or Firm* — Loza & Loza, LLP

(57) ABSTRACT

System, methods and apparatus are described that improve signaling in a three-wire multiphase communication link. A method for data communications includes determining a transition in signaling state of three wires of a communication link between a pair of consecutive symbols transmitted on the communication link, and enhancing or attenuating energy of a signal prior to the transition in signaling state of the three wires when the transition in signaling state includes a change in signaling state of a wire on which the signal is transmitted. Each symbol may define a different signaling state of the three wires of the communication link. For each symbol transmitted, two of the three wires are differentially encoded and the third wire is in a neutral state. Different wires are differentially encoded during transmission of consecutive symbols.

30 Claims, 15 Drawing Sheets

PROGRAMMABLE PRE-EMPHASIS CIRCUIT FOR MIPI C-PHY

BACKGROUND

1. Field

The present disclosure relates generally to high-speed data communications interfaces, and more particularly, signaling in multi-wire, multi-phase data communication links.

2. Background

Manufacturers of mobile devices, such as cellular phones, may obtain components of the mobile devices from various sources, including different manufacturers. For example, an application processor in a cellular phone may be obtained from a first manufacturer, while the display for the cellular phone may be obtained from a second manufacturer. The application processor and a display or other device may be interconnected using a standards-based or proprietary physical interface. For example, a display may provide an interface that conforms to the Display System Interface (DSI) standard specified by the Mobile Industry Processor Interface Alliance (MIPI).

Higher frequency components of a high-speed signal traveling through a channel can be significantly attenuated due to channel bandwidth limitations and the degree of attenuation may correlate to the frequency of the signal. The losses of high frequency components can cause inter-symbol interference (ISI) and can increase jitter. A commonly-used compensation technique employs pre-emphasis at the transmitter, which may also be referred to as feed-forward equalization (FFE). FFE can be employed in single-ended and differential line drivers, but has limited effect on other types of drivers.

In one example, a three-wire interface (C-PHY) defined by MIPI uses a trio of conductors rather than differential pairs to transmit information between devices. Each of the three wires may be in one of three signaling states during transmission of a symbol over the C-PHY interface. Clock information is encoded in a sequence of symbols transmitted on the C-PHY link and a receiver generates a clock signal from transitions between consecutive symbols. In a C-PHY interface, the maximum speed of the communication link and the ability of a clock-data recovery (CDR) circuit to recover clock information may be limited by the maximum time variation related to transitions of signals transmitted on the different wires of the communication link.

Accordingly, there is an ongoing need to improve signaling capabilities of multi-wire interfaces.

SUMMARY

Embodiments disclosed herein provide systems, methods and apparatus that enable improved communications on a multi-wire and/or multiphase communications link. The communications link may be deployed in apparatus such as a mobile terminal having multiple Integrated Circuit (IC) devices.

In an aspect of the disclosure, a method for data communications includes determining a transition in signaling state of three wires of a communication link between a pair of consecutive symbols transmitted on the communication link, and enhancing or attenuating energy of a signal prior to the transition in signaling state of the three wires when the transition in signaling state includes a change in signaling state of a wire on which the signal is transmitted. Each symbol may define a different signaling state of the three wires of the communication link. During transmission of a first symbol in the pair of consecutive symbols, a first wire of the three wires and a second wire of the three wires may be at voltage levels that have different polarities from one another with respect to a reference voltage level. During transmission of a second symbol in the pair of consecutive symbols, the first wire and a third wire of the three wires may be at the voltage levels that have different polarities from one another.

In another aspect, the reference voltage level is defined by the third wire during transmission of the first symbol and the reference voltage level is defined by the second wire during transmission of the second symbol.

In another aspect, the energy of the signal is enhanced when the transition in signaling state of the three wires includes a polarity change of the signal. The energy of the signal may be attenuated when the transition in signaling state of the three wires does not include a polarity change of the signal.

In another aspect, enhancing or attenuating the energy of the signal includes pre-emphasizing the signal by initiating the transmission of the second symbol before the transmission of the first symbol is terminated.

In another aspect, the energy of the signal is enhanced when the change in signaling state of the wire on which the signal is transmitted results in a swing in a difference voltage measured between two of the three wires that exceeds the maximum voltage range of the signal.

In another aspect, the energy of the signal is enhanced or attenuated based on signaling state of all three wires after the transition. The energy of the signal may be enhanced or attenuated based on changes in relative signaling states of each pairing of wires in the three wires. The energy of the signal may be enhanced or attenuated based on changes in the signaling state of all three wires. Enhancing or attenuating energy of a signal may include enabling or disabling a set of driver circuits coupled to the wire on which the signal is transmitted.

In an aspect of the disclosure, an apparatus includes means for determining a transition in signaling state of three wires of a communication link between a pair of consecutive symbols transmitted on the communication link, and means for enhancing or attenuating energy of a signal prior to the transition in signaling state of the three wires when the transition in signaling state includes a change in signaling state of a wire on which the signal is transmitted. Each symbol may define a different signaling state of the three wires of the communication link. A first wire of the three wires and a second wire of the three wires may be at voltage levels that have different polarities from one another with respect to a reference voltage level during transmission of a first symbol in the pair of consecutive symbols. The first wire and a third wire of the three wires may be at the voltage levels that have different polarities from one another during transmission of a second symbol in the pair of consecutive symbols.

In an aspect of the disclosure, an apparatus, includes a processing circuit configured to determine a transition in signaling state of three wires of a communication link between a pair of consecutive symbols transmitted on the communication link, and to enhance or attenuate energy of a signal prior to the transition in signaling state of the three wires when the transition in signaling state includes a change in signaling state of a wire on which the signal is transmitted. Each symbol defines a different signaling state of the three wires of the communication link. During transmission of a first symbol in the pair of consecutive symbols, a first wire of the three wires and a second wire of the three wires may be at voltage levels that have different polarities from one another with respect to a reference voltage level. During transmission of a second symbol in the pair of consecutive symbols, the first wire and a third wire of the three wires may be at the voltage levels that have different polarities from one another.

In an aspect of the disclosure, a processor-readable storage medium has one or more instructions stored or maintained thereon. The instructions, when executed by at least one processing circuit, cause the at least one processing circuit to determine a transition in signaling state of three wires of a communication link between a pair of consecutive symbols transmitted on the communication link, and enhance or attenuate energy of a signal prior to the transition in signaling state of the three wires when the transition in signaling state includes a change in signaling state of a wire on which the signal is transmitted. Each symbol defines a different signaling state of the three wires of the communication link. During transmission of a first symbol in the pair of consecutive symbols, a first wire of the three wires and a second wire of the three wires are at voltage levels that have different polarities from one another with respect to a reference voltage level. During transmission of a second symbol in the pair of consecutive symbols, the first wire and a third wire of the three wires are at the voltage levels that have different polarities from one another.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Certain aspects of the invention may be applicable to communications links deployed between electronic devices that are subcomponents of a mobile apparatus such as a telephone, a mobile computing device, an appliance, automobile electronics, avionics systems, etc. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similar functioning device.

Figure 1:
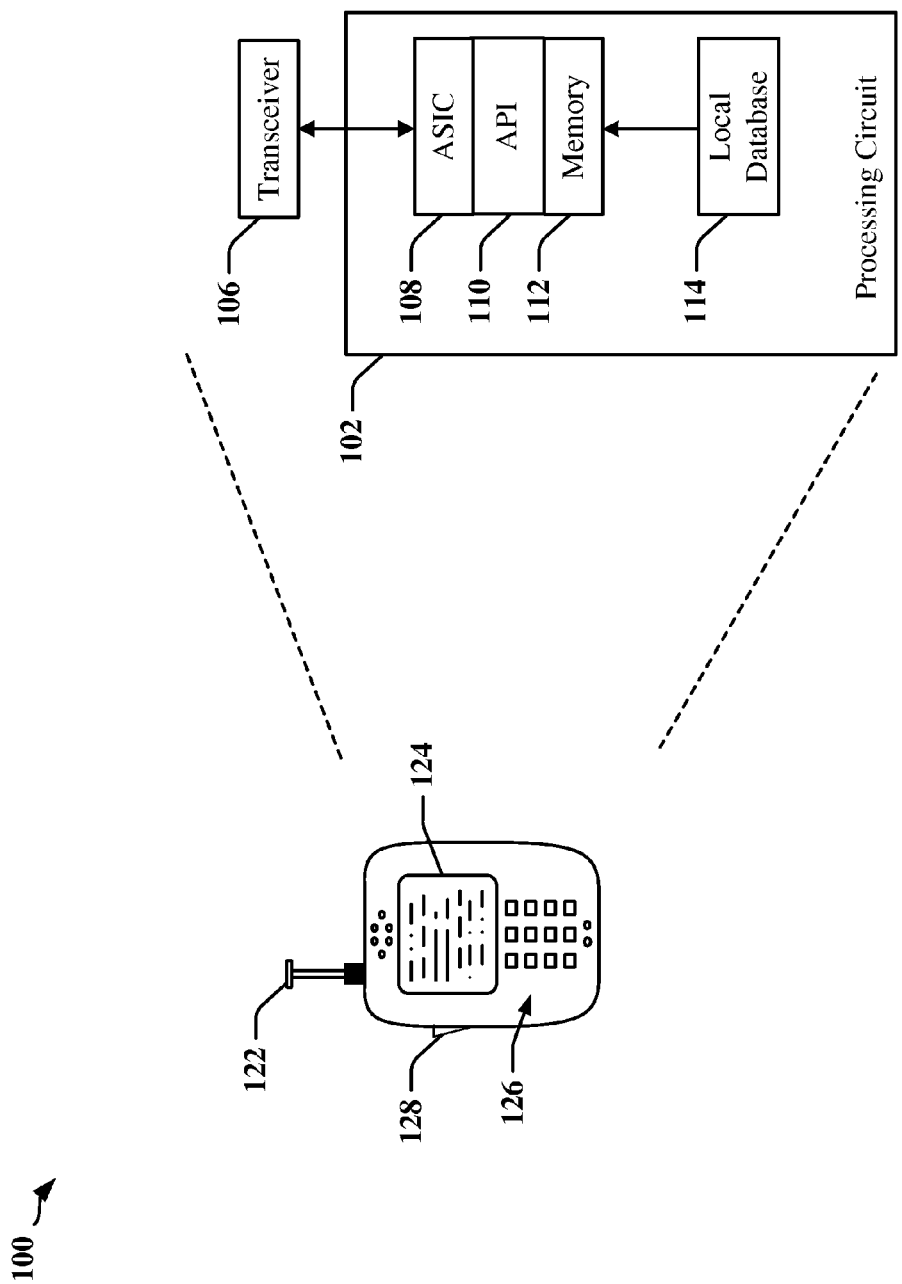
FIG. 1 depicts an apparatus employing a data link between IC devices that selectively operates according to one of plurality of available standards.

FIG. 1 depicts an apparatus 100 that may employ a communication link between IC devices. In one example, the apparatus 100 may include a wireless communication device that communicates through an RF transceiver with a radio access network (RAN), a core access network, the Internet and/or another network. The apparatus 100 may include a communications transceiver 106 operably coupled to a processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as a memory device 112 that may maintain instructions and data that may be executed by processing circuit 102. The processing circuit 102 may be controlled by one or more of an operating system and an application programming interface (API) 110 layer that supports and enables execution of software modules residing in storage media, such as a memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate apparatus 100. A local database 114 may be implemented using one or more of a database module, flash memory, magnetic media, EEPROM, optical media, tape, soft or hard disk, or the like. The processing circuit may also be operably coupled to external devices such as antenna 122, display 124, operator controls, such as button 128 and keypad 126 among other components.

Figure 2:
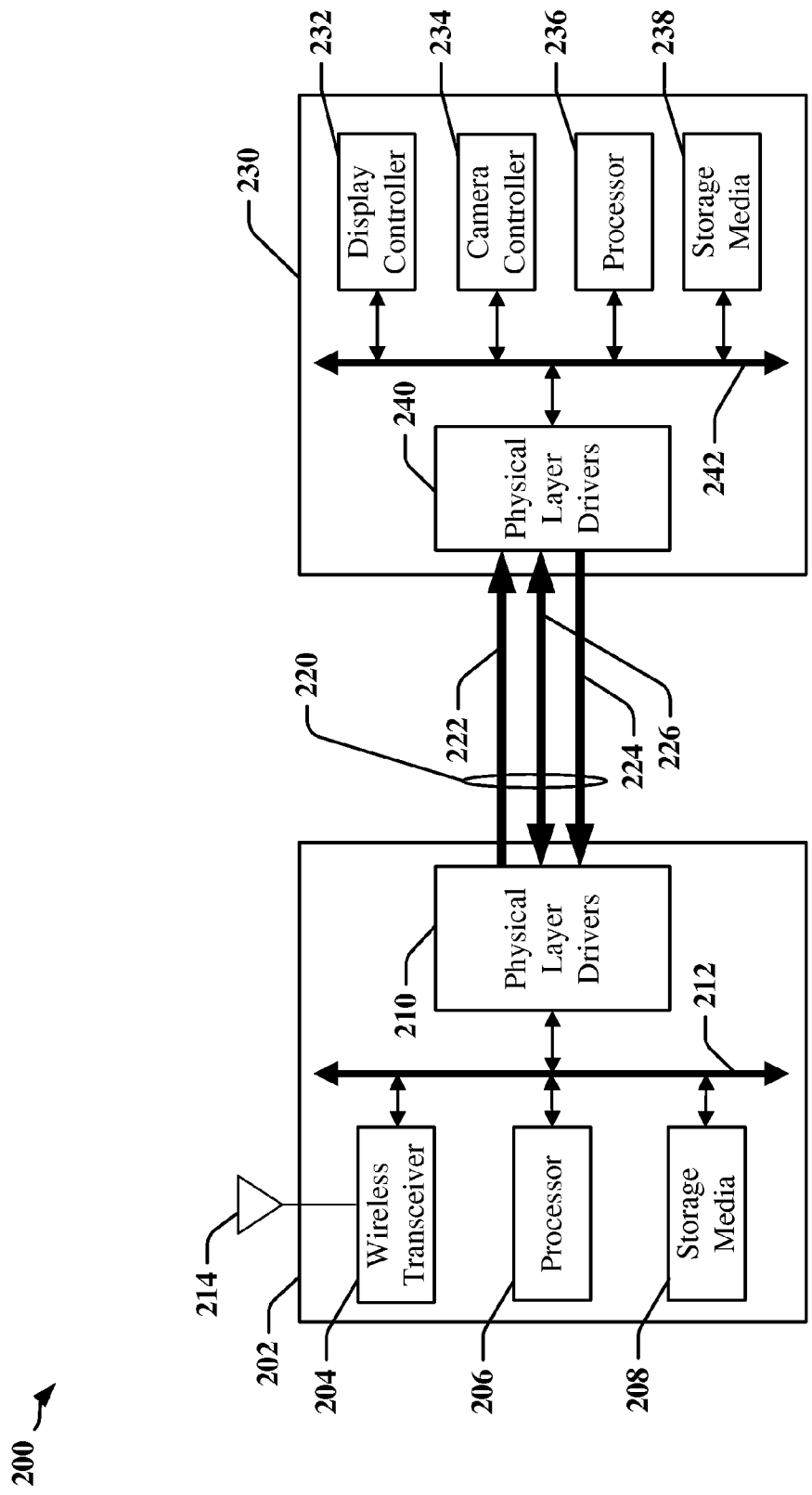
FIG. 2 illustrates a system architecture for an apparatus employing a data link between IC devices that selectively operates according to one of plurality of available standards.

FIG. 2 is a block schematic 200 illustrating certain aspects of an apparatus that includes a plurality of IC devices 202 and 230 that exchange data and control information through a communication link 220. The communication link 220 may be used to connect a pair of IC devices 202 and 230 that are located in close proximity to one another, or that are physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in half-duplex and/or full-duplex modes. One or more channel 222 and 224 may be unidirectional. The communication link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host system or transmitter, while the second IC device 230 may be designated as a client system or receiver, even if both IC devices 202 and 230 are configured to transmit and receive on the communications link 222. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more internal bus 212 and 242 and/or a channel 222, 224 and/or 226 of the communication link 220.

The reverse link 224 may be operated in the same manner as the forward link 222, and the forward link 222, and reverse link 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional link 226 may support communications between the first IC device 202 and the second IC device 230. The forward link 222 and/or reverse link 224 may be configurable to operate in a bidirectional mode when, for example, the forward and reverse links 222 and 224 share the same physical connections and operate in a half-duplex manner. In one example, the communication link 220 may be operated to communicate control, command and other information between the first IC device 202 and the second IC device 230 in accordance with an industry or other standard.

The communication link 220 of FIG. 2 may be implemented according to MIPI specifications for C-PHY and may provide a wired bus that includes a plurality of signal wires (denoted as M wires). The M wires may be configured to carry N-phase encoded data in a high-speed digital interface, such as a mobile display digital interface (MDDI). The M wires may facilitate N-phase polarity encoding on one or more of the channels 222, 224 and 226. The physical layer drivers 210 and 240 may be configured or adapted to generate N-phase polarity encoded data for transmission on the communication link 220. The use of N-phase polarity encoding provides high speed data transfer and may consume half or less of the power of other interfaces because fewer drivers are active in N-phase polarity encoded data communication links 220.

The physical layer derivers 210 and/or 240 (e.g., N-phase polarity encoding devices) can typically encode multiple bits per transition on the communication link 220. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
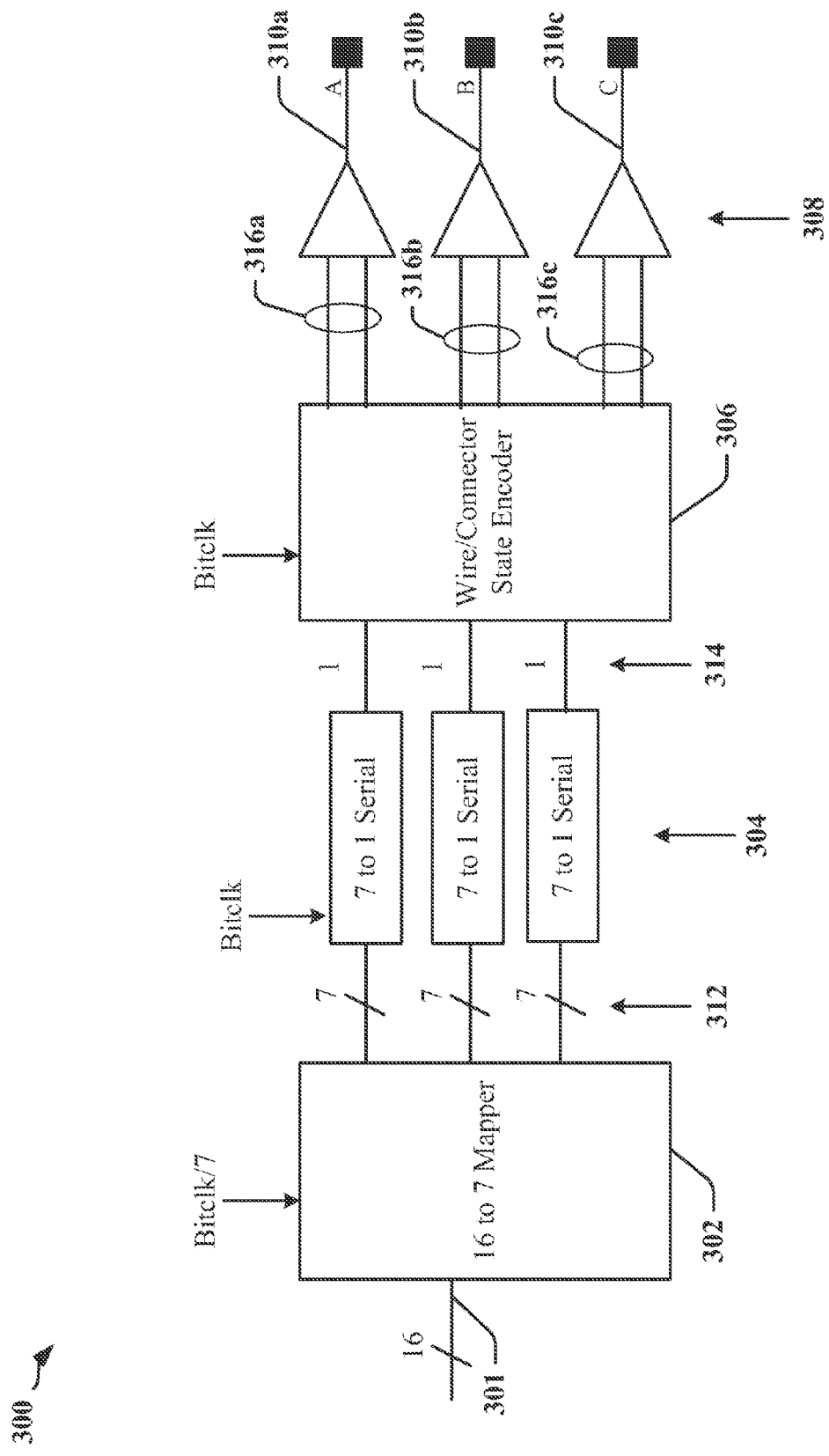
FIG. 3 illustrates a C-PHY data encoder.

FIG. 3 is a schematic diagram 300 illustrating a 3-wire, 3-phase polarity encoder that may be used to implement certain aspects of the communication link 220 depicted in FIG. 2. The example of 3-wire, 3-phase encoding is selected solely for the purpose of simplifying descriptions of certain aspects of the invention. The principles and techniques disclosed for 3-wire, 3-phase encoders can be applied in other configurations of M-wire, N-phase polarity encoders.

Signaling states defined for each of the 3 wires in a 3-wire, 3-phase polarity encoding scheme may include an undriven state, a positively driven state and a negatively driven state. The positively driven state and the negatively driven state may be obtained by providing a voltage differential between two of the signal wires 310a, 310b and/or 310c (also referred to as connectors and/or conductors), and/or by driving a current through two of the signal wires 310a, 310b and/or 310c connected in series such that the current flows in different directions in the two signal wires 310a, 310b and/or 310c. The undriven state may be realized by placing an output of a driver of a signal wire 310a, 310b or 310c in a high-impedance mode. Alternatively, or additionally, an undriven state may be obtained on a signal wire 310a, 310b or 310c by passively or actively causing an "undriven" signal wire 310a, 310b or 310c to attain a voltage level that lies substantially halfway between positive and negative voltage levels provided on driven signal wires 310a, 310b and/or 310c. Typically, there is no significant current flow through an undriven signal wire 310a, 310b or 310c. Signaling states defined for a 3-wire, 3-phase polarity encoding scheme may be denoted using the three voltage or current states (+1, −1, and 0).

A 3-wire, 3-phase polarity encoder may employ line drivers 308 to control the signaling state of connectors 310a, 310b and 310c. The drivers 308 may be implemented as unit-level current-mode or voltage-mode drivers. In one example, each driver 308 may receive sets of two or more of signals 316a, 316b and 316c that determine the output state of corresponding connectors 310a, 310b and 310c. In one example, the sets of two signals 316a, 316b and 316c may include a pull-up signal (PU signal) and a pull-down signal (PD signal) that, when high, activate pull-up and pull down circuits that drive the connectors 310a, 310b and 310c toward a higher level or lower level voltage, respectively. In this example, when both the PU signal and the PD signal are low, the connectors 310a, 310b and 310c may be terminated to a mid-level voltage.

For each transmitted symbol interval in an M-wire, N-phase polarity encoding scheme, at least one signal wire 310a, 310b or 310c is in the midlevel/undriven (0) voltage or current state, while the number of positively driven (+1 voltage or current state) signal wires 310a, 310b or 310c is equal to the number of negatively driven (−1 voltage or current state) signal wires 310a, 310b or 310c, such that the sum of current flowing to the receiver is always zero. For each symbol, the state of at least one signal wire 310a, 310b or 310c is changed from the symbol transmitted in the preceding transmission interval.

In operation, a mapper 302 may receive and map 16 bit data 301 to 7 symbols 312. In the 3-wire example, each of the 7 symbols defines the states of the signal wires 310a, 310b and 310c for one symbol interval. The 7 symbols 312 may be serialized using parallel-to-serial converters 304 that provide a timed sequence of states 314 for each wire 310a, 310b and 310c. The sequence of states 314 is typically timed using a transmission clock. A 3-wire 3-phase encoder 306 receives the sequence of states 314 representing the sequence of 7 symbols 312 produced by the mapper 302 one symbol at a time and computes the state of each signal wire 310a, 310b and 310c for each symbol interval. The 3-wire encoder 306 selects the states of the signal wires 310a, 310b and 310c based on a current input symbol and the previous states of signal wires 310a, 310b and 310c.

The use of M-wire, N-phase encoding permits a number of bits to be encoded in a plurality of symbols where the bits per symbol is not an integer. In the simple example of a 3-wire communications link, there are 3 available combinations of 2 wires, which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
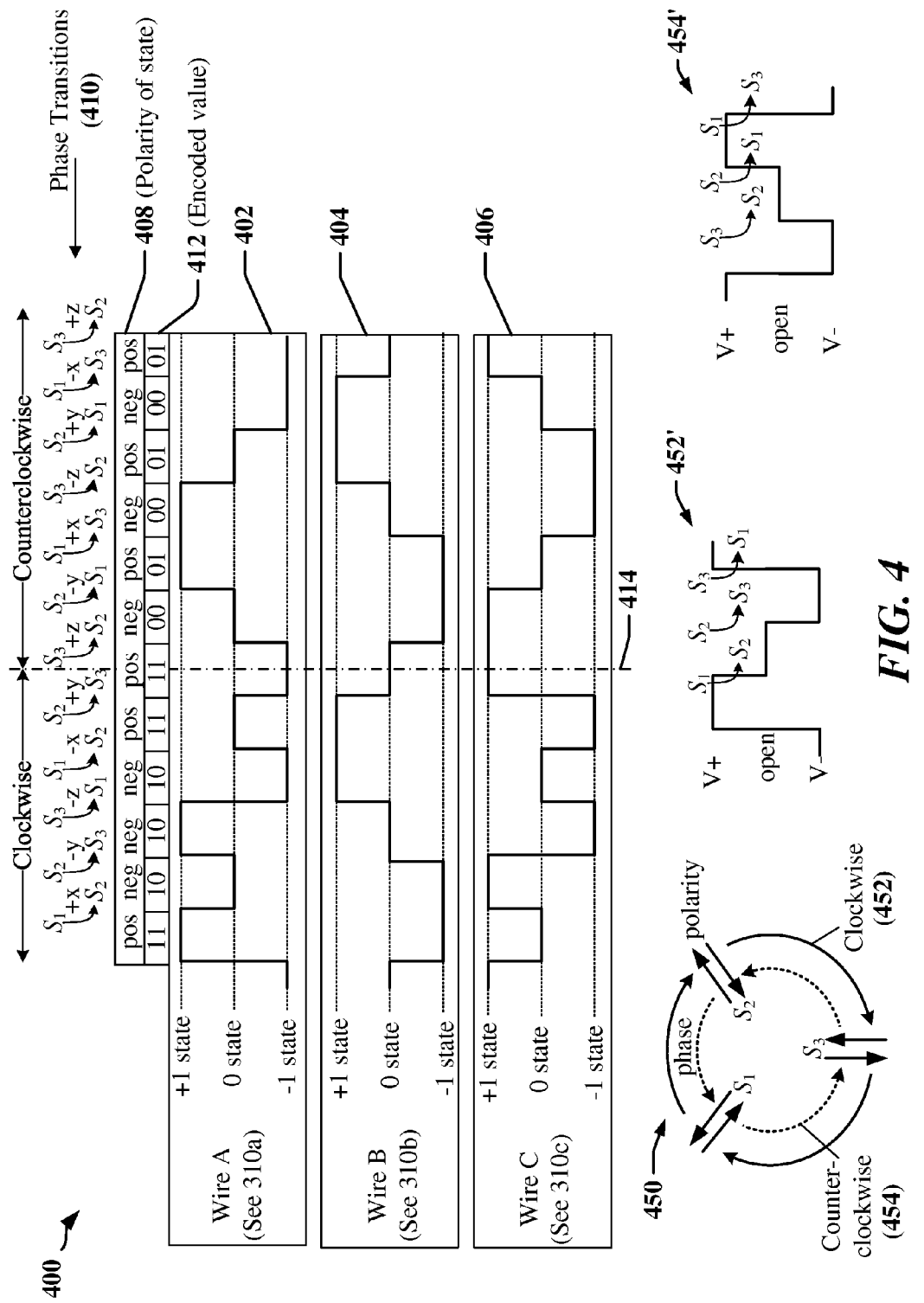
FIG. 4 illustrates signaling in a C-PHY encoded interface.

FIG. 4 includes an example of a timing chart 400 for signals encoded using a three-phase modulation data-encoding scheme, which is based on the circular state diagram 450. Information may be encoded in a sequence of signaling states where, for example, a wire or connector is in one of three phase states $S_1$, $S_2$ and $S_3$ defined by the state diagram 450. Each state may be separated from the other states by a 120° phase shift. In one example, data may be encoded in the direction of rotation of phase states on the wire or connector. The phase states in a signal may rotate in clockwise direction 452 and 452' or counterclockwise direction 454 and 454'. In the clockwise direction 452 and 454' for example, the phase states may advance in a sequence that includes one or more of the transitions from $S_1$ to $S_2$, from $S_2$ to $S_3$ and from $S_3$ to $S_1$. In the counterclockwise direction 454 and 454', the phase states may advance in a sequence that includes one or more of the transitions from $S_1$ to $S_3$, from $S_3$ to $S_2$ and from $S_2$ to $S_1$. The three wires 310a, 310b and 310c carry different versions of the same signal, where the versions are phase shifted by 120° with respect to one another. Each signaling state may be represented as a different voltage level on a wire or connector and/or a direction of current flow through the wire or connector. During each of the sequence of signaling states in a 3-wire system, each wire 310a, 310b and 310c is in a different signaling states than the other wires. When more than 3 wires 310a, 310b and 310c are used in a 3-phase encoding system, two or more wires 310a, 310b and/or 310c can be in the same signaling state at each signaling interval, although each state is present on at least one wire 310a, 310b and/or 310c in every signaling interval.

Information may be encoded in the direction of rotation at each phase transition 410, and the 3-phase signal may change direction for each signaling state. Direction of rotation may be determined by considering which wires 310a, 310b and/or 310c are in the '0' state before and after a phase transition, because the undriven wire 310a, 310b and/or 310c changes at every signaling state in a rotating three-phase signal, regardless of the direction of rotation.

The encoding scheme may also encode information in the polarity 408 of the two conductors 310a, 310b and/or 310c that are actively driven. At any time in a 3-wire implementation, exactly two of the conductors 310a, 310b, 310c are driven with currents in opposite directions and/or with a voltage differential. In a simple implementation, data may be encoded using two bit values 412, where one bit is encoded in the direction of phase transitions 410 and the second bit is encoded in the polarity 408 for the current state.

The timing chart 400 illustrates data encoding using both phase rotation direction and polarity. The curves 402, 404 and 406 relate to signals carried on three wires 310a, 310b and 310c, respectively for multiple phase states. Initially, the phase transitions 410 are in a clockwise direction and the most significant bit is set to binary '1,' until the rotation of phase transitions 410 switches at a time 414 to a counter-clockwise direction, as represented by a binary '0' of the most significant bit. The least significant bit reflects the polarity 408 of the signal in each state.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available from any current state. Accordingly, there may be $\log_2(5) \cong 2.32$ bits encoded per symbol (transition), which allows the mapper 302 to accept a 16-bit word and encode it in 7 symbols.

N-Phase data transfer may use more than three wires provided in a communication medium, such as a bus. The use of additional signal wires that can be driven simultaneously provides more combinations of states and polarities and allows more bits of data to be encoded at each transition between states. This can significantly improve throughput of the system, and reduce the power consumption over approaches that use multiple differential pairs to transmit data bits, while providing increased bandwidth.

In one example, an encoder may transmit symbols using 6 wires with 2 pairs of wires driven for each state. The 6 wires may be labeled A through F, such that in one state, wires A and F are driven positive, wires B and E negative, and C and D are undriven (or carry no current). For six wires, there may be:

$$C(6,4)=6!/(6-4)!\cdot 4!=15$$

possible combinations of actively driven wires, with:

$$C(4,2)=4!/(4-2)!\cdot 2!=6$$

different combinations of polarity for each phase state.

The 15 different combinations of actively driven wires may include:
ABCD ABCE ABCF ABDE ABDF
ABEF ACDE ACDF ACEF ADEF
BCDE BCDF BCEF BDEF CDEF Of the 4 wires driven, the possible combinations of two wires driven positive (and the other two must be negative). The combinations of polarity may include:
++−− +−−+ +−+− −+−+ −++− −−++

Accordingly, the total number of different states may be calculated as 15×6=90. To guarantee a transition between symbols, 89 states are available from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires},N_{driven})=N_{wires}!/(N_{wires}-N_{driven})!\cdot N_{driven}!$$

The equation for the number of combinations of polarity for the wires being driven is:

$$C(N_{driven},N_{driven}/2)=N_{driven}!/((N_{driven}/2)!)^2$$

The equivalent number of bits per symbol is:

$$\log_2(C(N_{wires},N_{driven})\cdot C(N_{driven},N_{driven}/2)-1)$$

Figure 5:
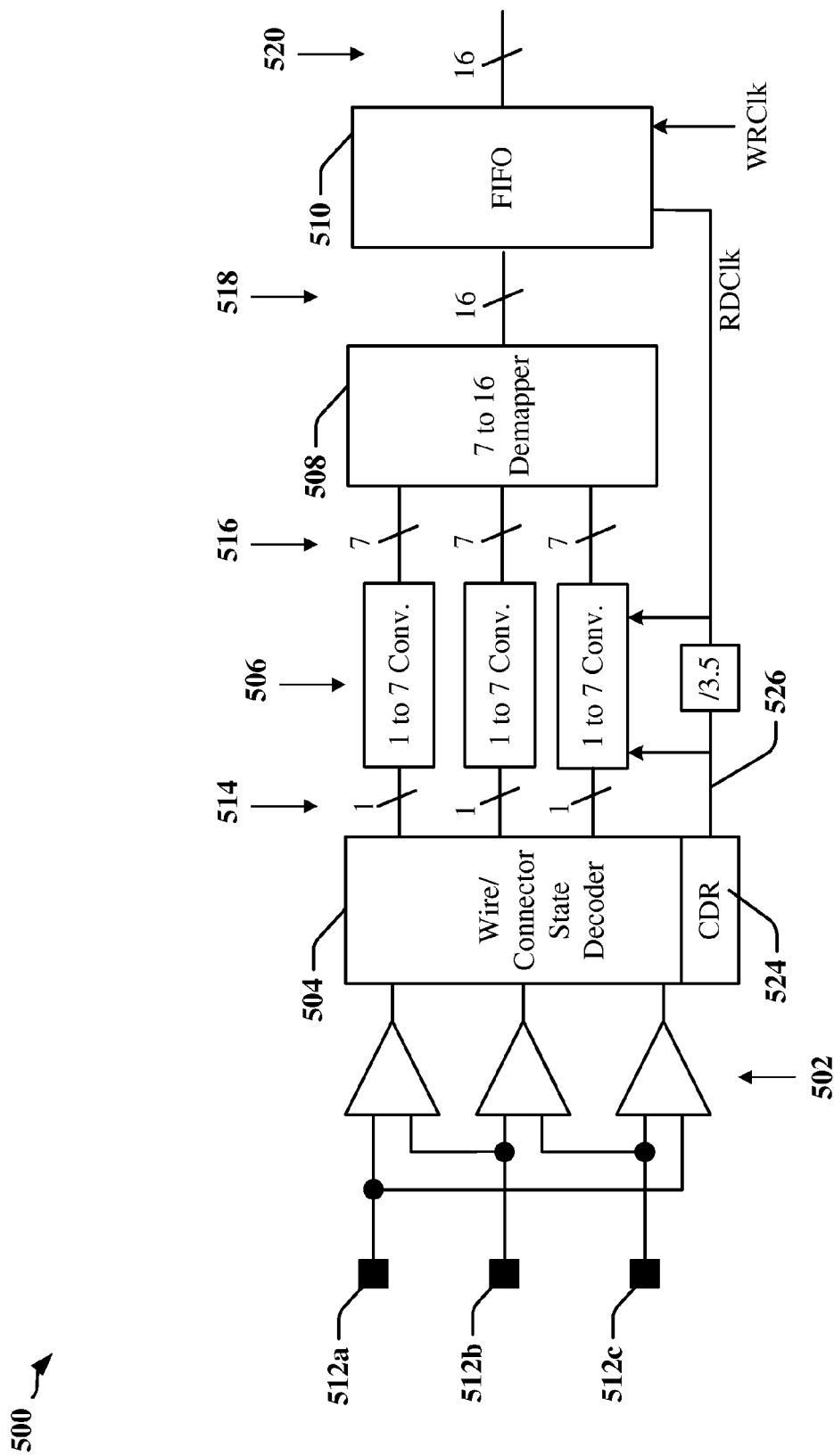
FIG. 5 illustrates a C-PHY decoder.

FIG. 5 is a diagram 500 illustrating certain aspects of a 3-wire, 3-phase decoder. Differential receivers 502 and a wire state decoder 504 are configured to provide a digital representation of the state of the three transmission lines 512a, 512b and 512c, with respect to one another, and to detect changes in the state of the three transmission lines compared to the state transmitted in the previous symbol period. Seven consecutive states are assembled by the serial-to-parallel converters 506 to obtain a set of 7 symbols to be processed by the demapper 508. The demapper 508 produces 16 bits of data that may be buffered in FIFO 510.

The wire state decoder 504 may extract a sequence of symbols 514 from phase encoded signals received on the wires 512a, 512b and 512c. The symbols 514 are encoded as a combination of phase rotation and polarity as disclosed herein. The wire state decoder may include a CDR 524 that extracts a clock 526 that can be used to reliably capture symbols from the wires 512a, 512b and 512c. A transition occurs on least one of the wires 512a, 512b and 512c at each symbol boundary and the CDR 524 may be configured to generate the clock 526 based on the occurrence of a transition or multiple transitions. An edge of the clock may be delayed to allow time for all wires 512a, 512b and 512c to have stabilized and to thereby ensure that the current symbol is captured for decoding purposes.

Figure 6:
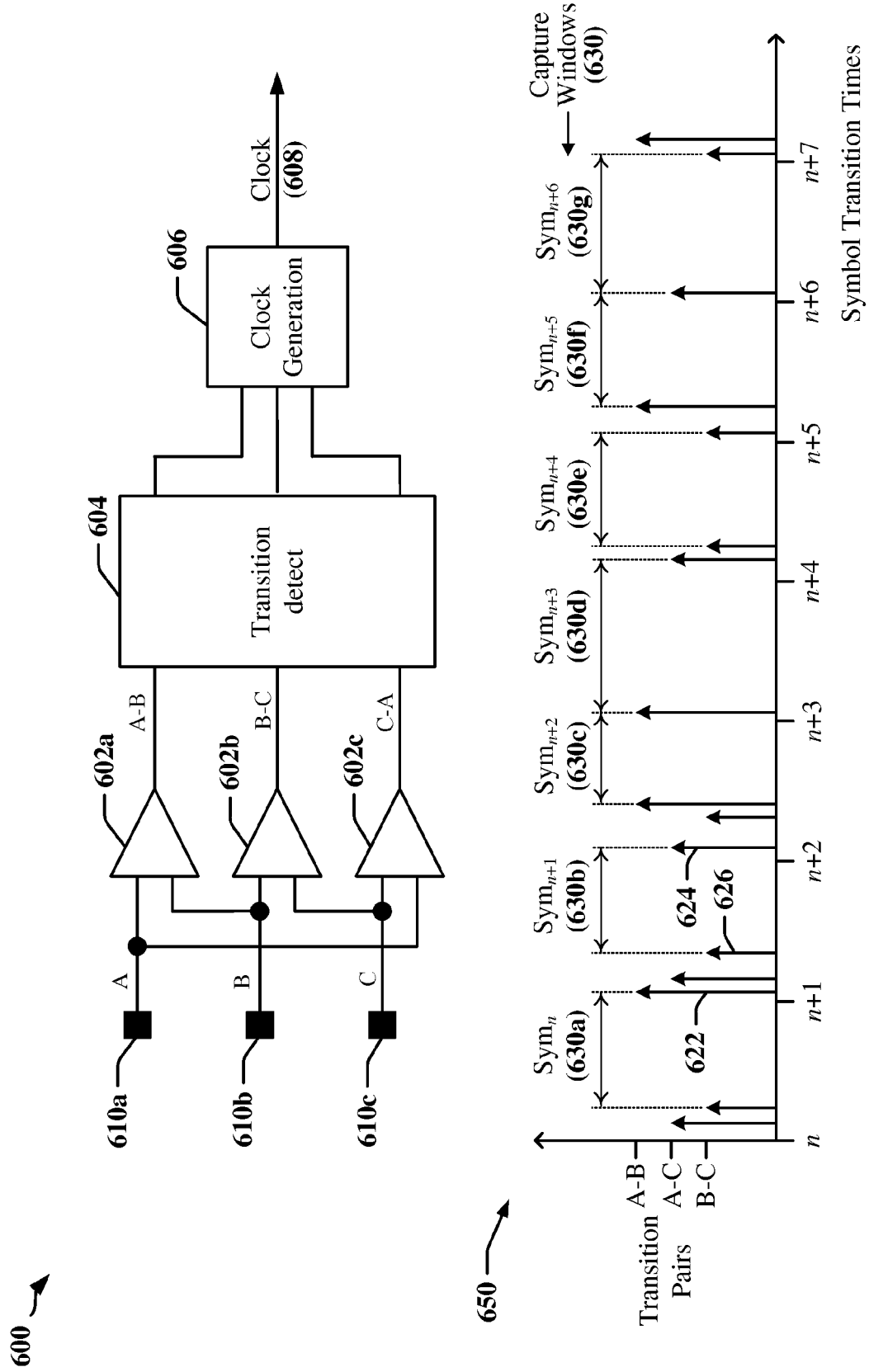
FIG. 6 illustrates transition detection in a C-PHY decoder.

FIG. 6 includes a block schematic 600 illustrating certain aspects of clock generation in a 3-wire, 3-phase decoder. A set of differential receivers 602a, 602b and 602c is configured to compare each of three wires 610a, 610b and 610c with the other of the three wires 610a, 610b and 610c. In the example depicted, a first differential receiver 602a compares the states of wires 610a and 610b, a second differential receiver 602b compares the states of wires 610b and 610c and a third differential receiver 602c compares the states of wires 610a and 610c. Accordingly, transition detection circuitry 604 can be configured to detect occurrence of a phase change because the output of at least one of the differential receivers 602a, 602b and 602c changes at the end of each symbol interval.

Certain transitions between transmitted symbols may be detectable by a single differential receiver 602a, 602b or 602c, while other transitions may be detected by two or more of the differential receivers 602a, 602b and 602c. In one example the states, or relative states of two wires may be unchanged after a transition and the output of a corresponding differential receiver 602a, 602b or 602c may also be unchanged after the phase transition. In another example, both wires in a pair of wires 602a, 602b and/or 602c may be in the same state in a first time interval and both wires may be in a same second state in a second time interval and the corresponding differential receiver 602a, 602b or 602c may be unchanged after the phase transition. Accordingly, a clock generation circuit 606 may include transition detect circuits and logic 604 to monitor the outputs of all differential receivers 602a, 602b and 602c in order to determine when a phase transition has occurred, The clock generation circuit may generate a receive clock 608 based on detected phase transitions.

Changes in signaling states of the 3 wires may be detected at different times for different combinations of the wires 610a, 610b and/or 610c. The timing of detection of signaling state changes may vary according to the type of signaling state change that has occurred. This result of this variability is illustrated in the simplified timing chart 650 of FIG. 6. Markers 622, 624 and 626 represent transitions identified by the transition change detection circuitry 604 and/or identifiable in the outputs of the differential receivers 602a, 602b and 602c. The markers 622, 624 and 626 are assigned different heights in the timing chart 650 for clarity of illustration only, and the relative heights of the markers 622, 624 and 626 are not intended to show a specific relationship to voltage or current levels, polarity or weighting values used for clock generation or data decoding. The timing chart 650 illustrates the effect of timing of transitions associated with symbols transmitted in phase and polarity on the three wires 610a, 610b and 610c. In the timing chart 650, transitions between some symbols may result in variable capture windows 630a, 630b, 630c, 630d, 630e, 630f and/or 630g (collectively symbol capture windows 630) during which symbols may be reliably captured. The number of state changes detected and their relative timing can result in jitter on the clock signal 608.

Figure 7:
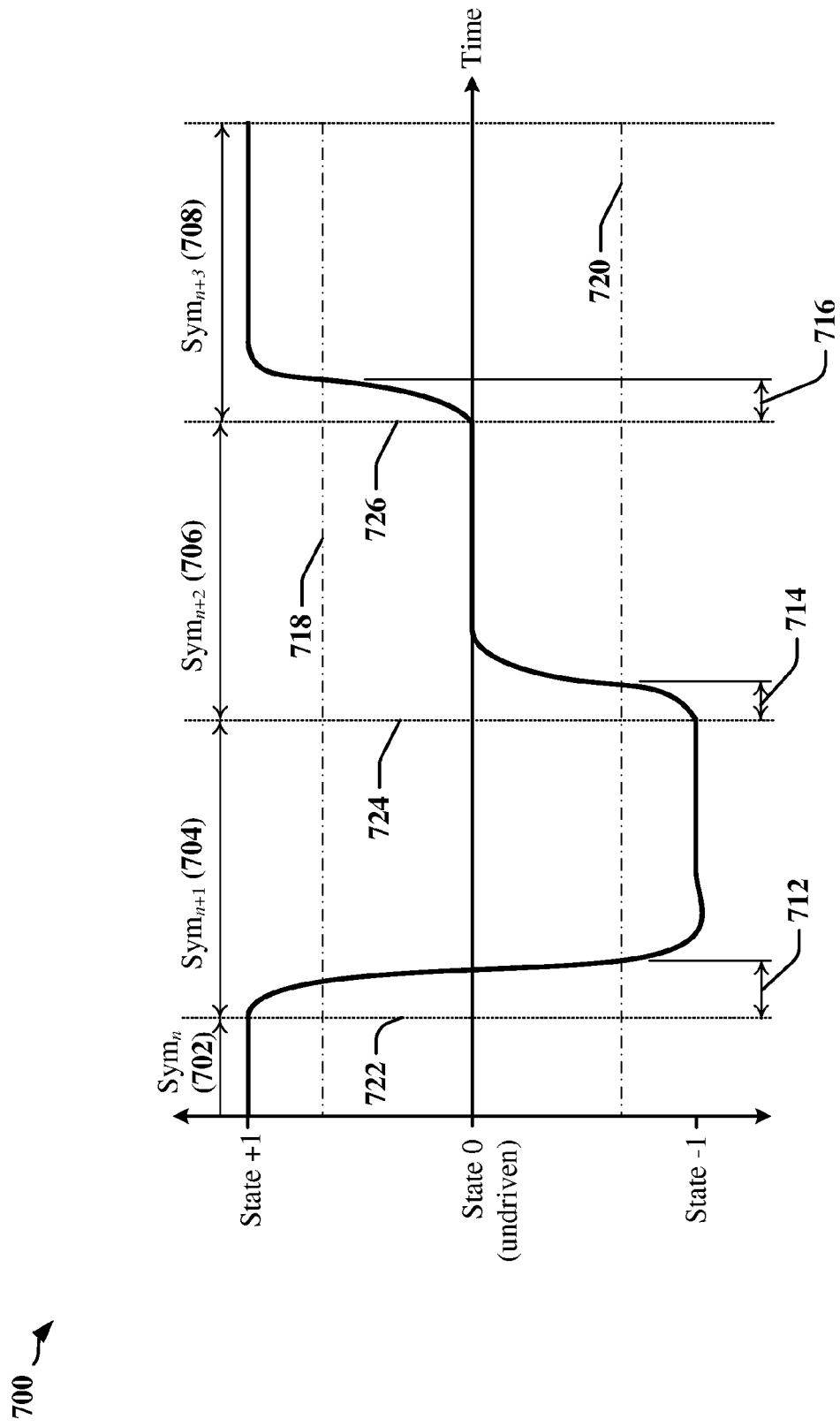
FIG. 7 is a simplified example of the effects of signal rise times on transition detection in a C-PHY decoder.

Variability in the sizes of the symbol windows 630 and jitter may be caused in part by the electrical characteristics of the wires 610a, 610b and 610c, as illustrated in the simple example 700 depicted in FIG. 7. The throughput of a C-PHY communications link may be affected by duration and variability in signal transition times. For example, variability in detection circuits may be caused by manufacturing process tolerances, variations and stability of voltage and current sources and operating temperature. Certain impediments to accomplishing higher data rates are attributable to channel bandwidth and its increased effect on higher frequency components of digital signals. For example, attenuation of the higher frequencies can affect signal rise and fall times. In conventional line drivers, pre-emphasis circuits may be provided whereby the pre-emphasis circuits operate to increase the detection of transitions at the receiver. Some pre-emphasis circuits may affect the timing of signals by initiating a transition early or terminating a transition late. Other pre-emphasis circuits may increase the current flow provided by the driver during transitions. However, these pre-emphasis techniques may not be applicable in C-PHY interfaces.

In particular, large variability in signal transition times can be attributed to the existence of multiple different voltage or current levels used in 3-phase signaling. A simplified "voltage-level" example is depicted in FIG. 7, which illustrates transition times in a single wire 610a, 610b or 610c. A first symbol $Sym_n$ interval (for a first symbol 702) may end at time 722, a second symbol $Sym_{n+1}$ interval (for a second symbol 704) may end at time 724 and a third symbol $Sym_{n+2}$ interval (for a third symbol 706) may end at time 726, when a fourth symbol $Sym_{n+3}$ interval (for a fourth symbol 708) begins. The transition from a state determined by the first symbol 702 to the state corresponding to the second symbol 704 may be detected after a delay 712 attributable to the time taken for voltage in the wire 610a, 610b or 610c to reach a threshold voltage 718 and/or 720. The threshold voltages may be used to determine the state of the wire 610a, 610b or 610c. The transition from a state determined by the second symbol 704 to the state for the third symbol 706 may be detected after a delay 714 attributable to the time taken for voltage in the wire 610a, 610b or 610c to reach one of the threshold voltages 718 and/or 720. The transition from a state determined by the third symbol 706 to the state for the fourth symbol 708 may be detected after a delay 716 attributable to the time taken for voltage in the wire 610a, 610b or 610c to reach a threshold voltage 718 and/or 720. The delays 712, 714 and 716 may have different durations, which may be attributable in part to the different voltage or current levels associated with the 3 states and consequent different transition magnitudes.

Figure 8:
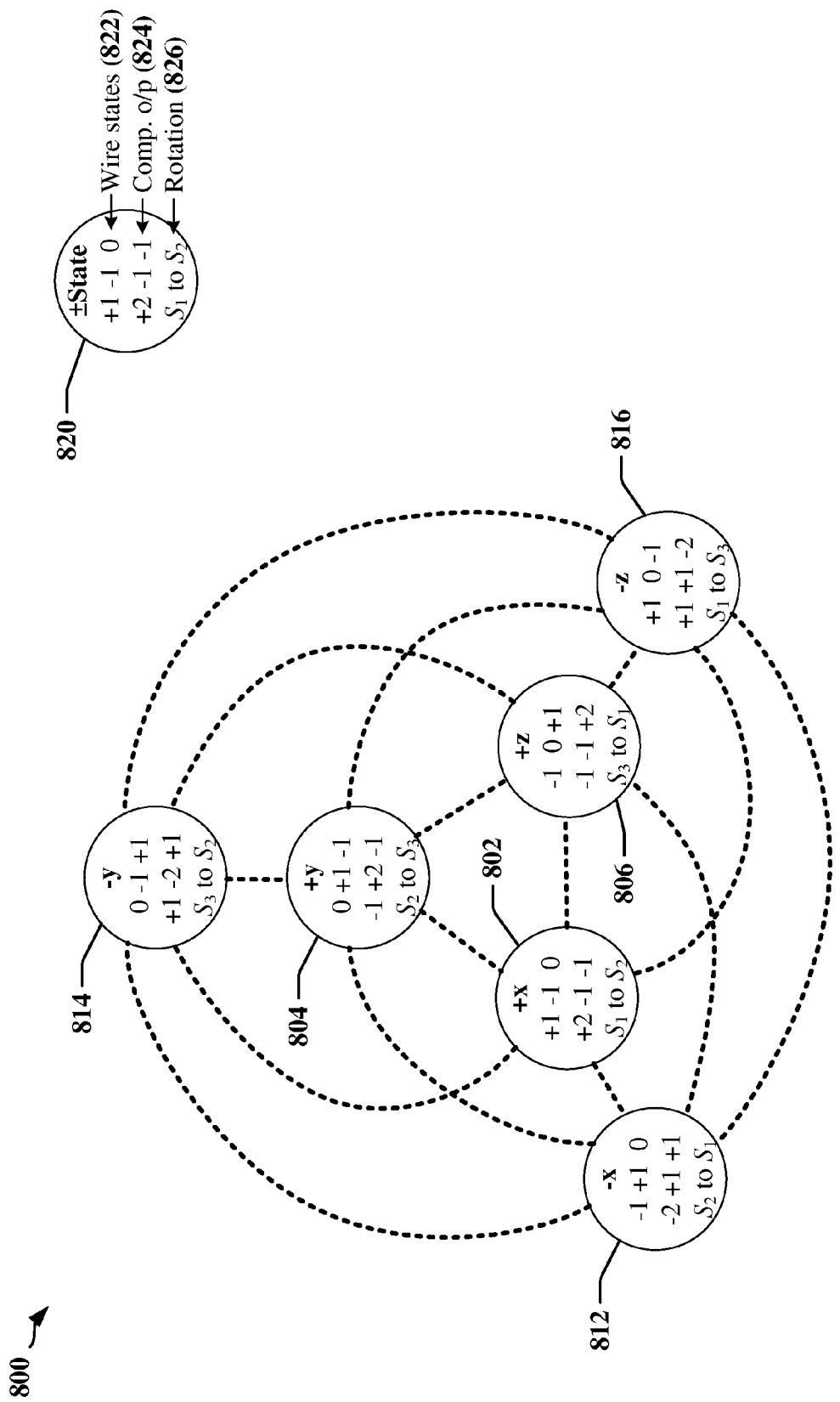
FIG. 8 is a state diagram illustrating potential state transitions in a C-PHY encoded interface.

FIG. 8 is a state diagram 800 illustrating 6 states and 30 possible state transitions in one example of a 3-wire, 3-phase communication link. The possible states 802, 804, 806, 812, 814 and 816 in the state diagram 800 include and expand on the states shown in the diagram 450 of FIG. 4. As shown in the exemplar of a state element 820, each state 802, 804, 806, 812, 814 and 816 in the state diagram 800 includes a field 822 showing the voltage state of signals A, B and C (transmitted on wires 610a, 610b and 610c respectively), a field 824 showing the result of a subtraction of wire voltages by differential receivers 602a, 602b, 602c, respectively and a field 826 indicating the direction of rotation. For example, in state 802 (+x) wire A=+1, wire B=−1 and wire C=0, yielding output of differential receiver 602a (A−B)=+2, differential receiver 602b (B−C)=−1 and differential receiver 602c (C−A)=+1. As illustrated by the state diagram, transition decisions taken by phase change detect circuitry 604 are based on 5 possible levels produced by differential receivers 602a, 602b and 602c, which include −2, −1, 0, +1 and +2 voltage states.

Figure 9:
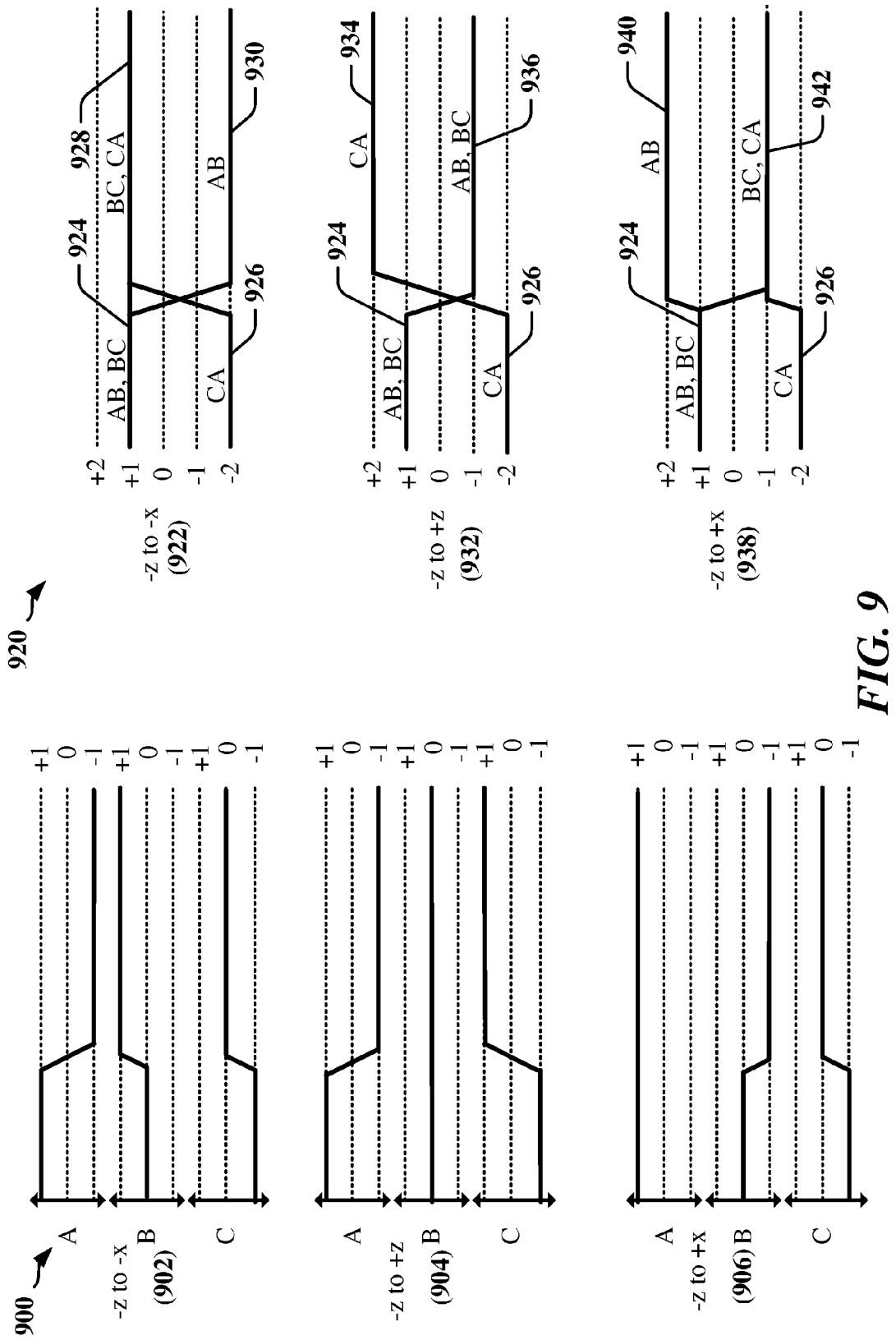
FIG. 9 illustrates one example of a set of signal transitions occurring between one pair of consecutive symbols transmitted on a C-PHY interface.

FIG. 9 includes timing charts 900 and 920 representative of certain examples of transitions from a first signaling state to a second signaling state between certain consecutive symbols. The signaling state transitions illustrated in the timing charts 900 and 920 are selected for illustrative purposes, and other transitions and combinations of transitions can occur in the MIPI C-PHY interface. The timing charts 900 and 920 relate to an example of a 3-wire, 3-phase communications link, in which multiple receiver output transitions may occur at each UI boundary due to differences in rise and fall time between the signal levels on the trio of wires. With reference also to FIG. 6, first timing charts 900 illustrate the signaling states of the trio of signal wires 610a, 610b and 610c (A, B, and C) before and after a transition and second timing charts 920 illustrate the outputs of the differential receivers 602a, 602b and 602c, which outputs are representative of the differences between signal wires 610a, 610b and 610c. In many instances, a set of differential receivers 602a, 602b and 602c may be configured to capture transitions by comparing different combinations for two signal wires 610a, 610b and 610c. In one example, these differential receivers 602a, 602b and 602c may be configured to produce outputs by determining the difference (e.g. by subtraction) of their respective input voltages.

In each of the examples shown in the timing charts 900 and 920, the initial symbol (−z) 816 (see FIG. 8) transitions to a different symbol. As shown in the timing charts 902, 904 and 906 signal A is initially in a +1 state, signal B is in a 0 state and signal C is in the −1 state. Accordingly, the differential receivers 602a, 602b initially measure a +1 difference 924 and the differential receiver 602c measures a −2 difference 926, as shown in the timing charts 922, 932, 938 for the differential receiver outputs.

In a first example of timing charts 902, 922, a transition occurs from symbol (−z) 816 to symbol (−x) 812 (see FIG. 8) in which signal A transitions to a −1 state, signal B transitions to a +1 state and signal C transitions to a 0 state, with the differential receiver 602a transitioning from +1 difference 924 to a −2 difference 930, differential receiver 602b remaining at a +1 difference 924, 928 and differential receiver 602c transitioning from −2 difference 926 to a +1 difference 928.

In a second example of timing charts 904, 932, a transition occurs from symbol (−z) 816 to symbol (+z) 806 in which signal A transitions to a −1 state, signal B remains at the 0 state and signal C transitions to a +1 state, with two differential receivers 602a and 602b transitioning from +1 difference 924 to a −1 difference 936, and differential receiver 602c transitioning from −2 difference 926 to a +2 difference 934.

In a third example of timing charts 906, 938, a transition occurs from symbol (−z) 816 to symbol (+x) 802 in which signal A remains at the +1 state, signal B transitions to the −1 state and signal C transitions to a 0 state, with the differential receiver 602a transitioning from a +1 difference 924 to a +2 difference 940, the differential receiver 602b transitioning from a +1 difference 924 to a −1 difference 942, and the differential receiver 602c transitioning from −2 difference 926 to a −1 difference 942.

These examples of timing charts 922, 932, 938 include examples of transitions in difference values spanning 0, 1, 2, 3, 4 and 5 levels. Pre-emphasis techniques used for typical differential or single-ended serial transmitters were developed for two level transitions and may introduce certain adverse effects if used on a MIPI C-PHY signal. In particular, a pre-emphasis circuit that overdrives a signal during transitions may cause overshoot during transitions spanning 1 or 2 levels and may cause false triggers to occur in edge sensitive circuits.

Figure 10:
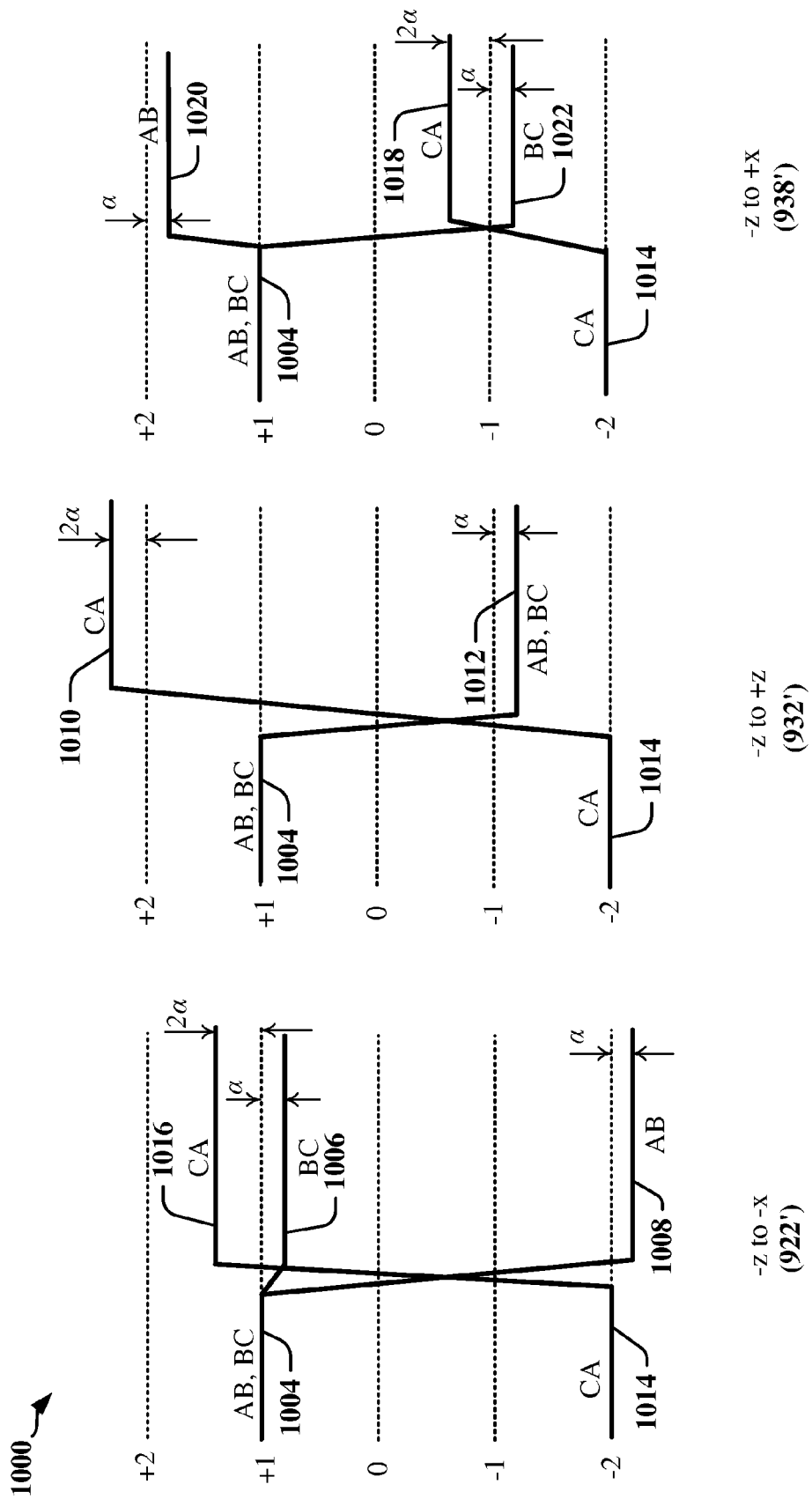
FIG. 10 illustrates the effect of pre-emphasis on signal transitions occurring between consecutive symbols transmitted on a C-PHY interface.

According to certain aspects of the disclosure, a pre-emphasis circuit for MIPI C-PHY driver may implement the mathematical equation d'[n]=d[n]−a*d[n−1] on every conductor, as discussed below. FIG. 10 illustrates the effect of pre-emphasis on some transitions related to the examples 902, 912 and 918 illustrated in FIG. 9. Certain pre-emphasis circuits for MIPI C-PHY driver are disclosed that compensate for channel loss by pre-amplifying high frequency signal energy at transitions.

Figure 11:
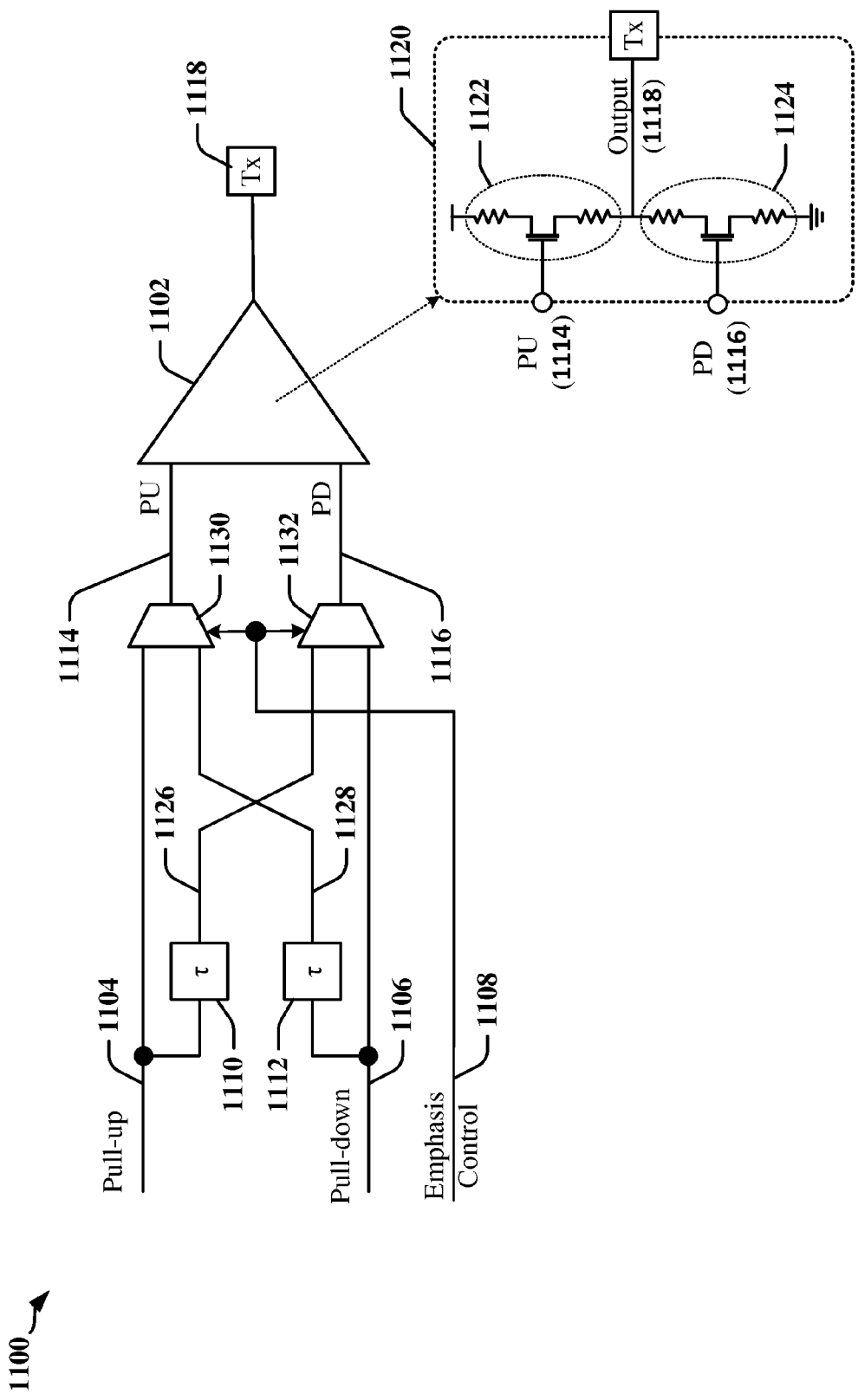
FIG. 11 illustrates a first example of a pre-emphasis circuit according to certain aspects disclosed herein.

FIG. 11 is a schematic drawing illustrating a pre-emphasis circuit 1100 according to certain aspects disclosed herein. The pre-emphasis circuit 1100 includes a line driver 1102, which may be equivalent to or substituted for the line-drivers 308 described in relation to FIG. 3. The line driver 1102 may include one or more parallel output circuits 1120 that respond to the input signals 1114 and 1116 by driving the output terminal 1118 to high or low voltage levels, respectively. Correspondingly, the multiplexers 1130 and 1132 may each include a respective group of multiplexers. Correspondingly, each of the PU signal 1114, the PD signal 1116 and the emphasis control signal 1108 may include a multi-bit bus signal. The line driver 1102 may additionally include one or more output circuits (not shown) that couple the output terminal 1118 to one or more termination impedances when a mid-level control signal is active and/or when both the PU 1114 and PD 1116 inputs are inactive (low state). The pre-emphasis circuit 1100 further includes delay elements 1110, 1112, which may be implemented using analog or digital delay circuits. The delay circuit 1110 provides a delayed version of an input pull-up control signal 1104 to a multiplexer 1132 used to select the PD input 1116 to the line driver 1102. The delay circuit 1112 provides a delayed version of an input pull-down control signal 1106 to a multiplexer 1130 used to select the PU input 1114 to the line driver 1102.

The first pre-emphasis circuit 1100 can be configured or adapted to implement the equation $d'[n]=d[n]-a*d[n-1]$ by controlling a portion (a) of bits in a symbol based on a signaling state associated with the preceding symbol, and using an emphasis amplitude control signal 1108. As illustrated in FIG. 11, pre-emphasis at signal transitions in MIPI C-PHY interface may be performed based on the nature of transition on a wire. For example, signal energy may be enhanced when the differential signal polarity changes, as illustrated for several signals 1006, 1008, 1010, 1012, 1016, 1018 and 1022 in FIG. 10. Attenuation may be provided when the differential signal polarity remains unchanged, as illustrated for one signal 1020 in FIG. 10. This approach enables a received '+1' or '-1' to be more easily distinguished.

The amount of pre-emphasis applied can also be controlled by selecting a portion of the output circuits 1120 in the driver 1102 that respond to pre-emphasis control. The multiplexers 1130 and 1132 may be addressed in a manner that enables the pull-up circuits 1122 and pull-down circuits 1124 based on the bit setting of the prior symbol. Thus, for example, a maximum portion M/N of the output circuits 1120 in the driver 1102 may be allocated for pre-emphasis, and desired pre-emphasis level can be programmed using an N-bit register, emp_con[N-1:0], by assigning a logic 1 value to M bits (emp_con[M-1:0]) of the N-bit register, and assigning a logic 0 value to the remainder of the bits in the of the N-bit register. The circuit illustrated in FIG. 11 can be easily implemented and used for compensating heavy channel loss. However, in some instances, the 50 ohm output (matching) impedance may not be guaranteed due to the change of termination resistor value on mid-level wire.

Figure 12:
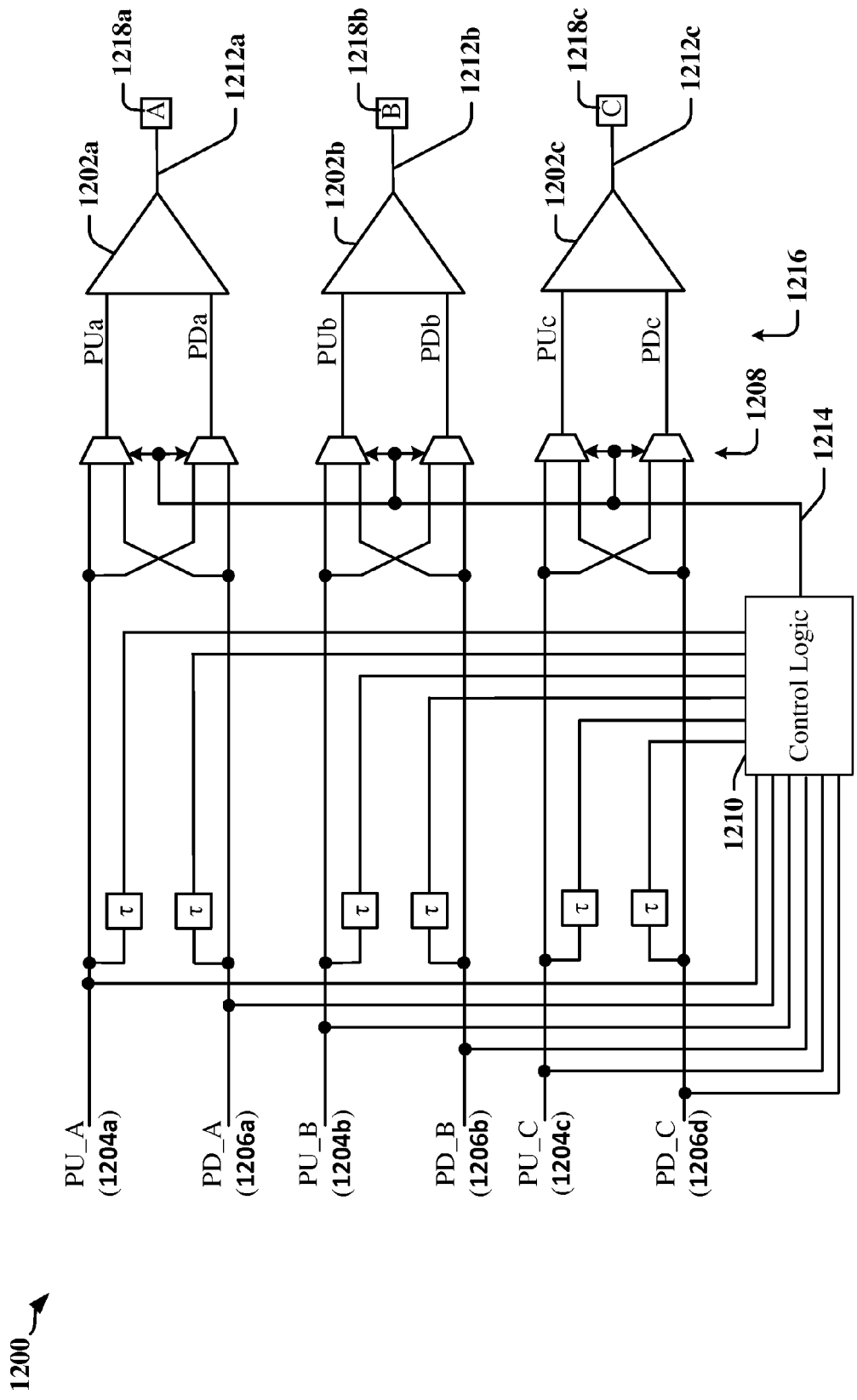
FIG. 12 illustrates a second example of a pre-emphasis circuit according to certain aspects disclosed herein.

FIG. 12 is a simplified schematic drawing illustrating a second example of a pre-emphasis circuit 1200 that can be used in a MIPI C-PHY interface. In this example, the pre-emphasis circuit 1200 includes control logic 1210 that is configured to monitor the state of the pull-up and pull-down control signals 1204a-1204c and 1206a-1206c in order to determine whether pre-emphasis should be applied to one or more outputs 1218a, 1218b and/or 1218c. The control logic may additionally determine the level or degree of pre-emphasis that should be applied to each of the outputs 1218a, 1218b and/or 1218c selected for pre-emphasis. The control logic 1210 also receives delayed versions of the pull-up and pull-down control signals 1204a-1204c and 1206a-1206c and can control pre-emphasis based on a knowledge of the prior signaling state of the outputs 1218a-1218c.

In operation, signal amplitude may be pre-emphasized to compensate for probable loss of amplitude after large-swing transitions, thereby improving signal quality and bit error rate at the receiver. In one example, the heaviest differential signal amplitude loss occurring in the example transition 902, 922 may affect the CA difference signal 926, 928 when signal A 1212a experiences a large swing transition from +1 to -1 without application of pre-emphasis. The control logic 1210 may determine that pre-emphasis is required after this transition. To ensure that an accurate 50 ohm output impedance is provided to each signal wire at the terminals 1218a-1218c, a complementary pre-emphasis may be performed on signal B 1212b. In another example, pre-emphasis may not be required for the example transition 906, 938 of FIG. 9 because no large-swing transition occurs.

The control logic 1210 may be configured to judge the case for pre-emphasis for each signal 1212a-1212c at each symbol transition. The control logic 1210 may distinguish between different circumstances and may decide whether or not emphasis action is needed for the current symbol. In some instances, both the control signals 1214 and pull-up/pull-down signals 1216 may be resynchronized by the symbol clock order to eliminate glitches in the output signals 1212a-1212c attributable to combinational logic delays. Accordingly, the output signals 1212a-1212c may be delayed by one symbol cycle.

Figure 13:
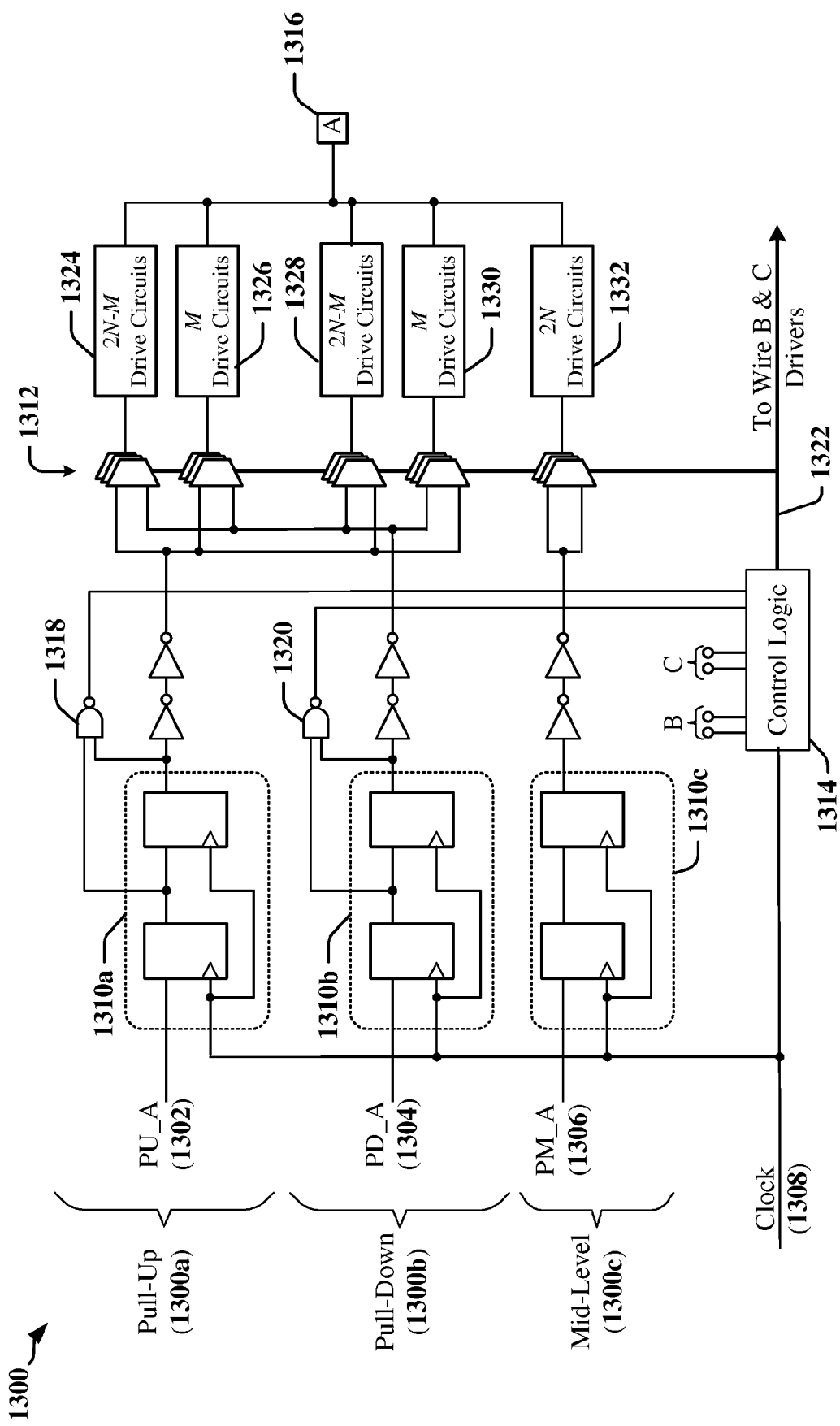
FIG. 13 is a block drawing illustrating an example of a pre-emphasis circuit for driving a single connector of a MIPI C-PHY interface.

FIG. 13 is a block drawing illustrating an example of a pre-emphasis circuit 1300 that can be used to drive one connector 1316 of a MIPI C-PHY interface. The pre-emphasis circuit 1300 includes a pull-up section 1300a, a pull-down section 1300b and a mid-level terminating section 1300c. Three instances of the pre-emphasis circuit 1300 may be provided in a driver device in order to drive the 3 wires of the MIPI C-PHY interface. Control logic 1314 may be configured to monitor the signaling state of the 3 wires and the progress of input signals 1302, 1304 through one or more delay elements 1310a, 1310b of the pre-emphasis circuit 1300, as well as certain signals derived by combinational logic 1318, 1320 provided within the pre-emphasis circuit 1300. The control logic 1314 may include a state machine, combinational logic, delay elements and other circuitry to generate control signals 1322 that select between the multiplexers 1312 during, before and after transmission of a symbol on the MIPI C-PHY interface.

Each of the three sections 1300a, 1300b and 1300c drives one phase of the 3-phase signaling scheme used on the MIPI C-PHY interface. A pull-up section 1300a receives a pull-up signal 1302 that indicates when the connector 1316 is to be driven to the high voltage level, a pull-down section 1300b receives a pull-down signal 1304 that indicates when the connector 1316 is to be driven to the low voltage level, and a mid-level section 1300c receives a signal 1306 that indicates when the connector 1316 is to be terminated to the mid-level voltage. It will be appreciated that any one of the three input signals 1302, 1304 or 1306 can be derived from the other two input signals 1302, 1304 and/or 1306.

In the example, the multiplexers 1312 for each of the pull-up and pull-down sections 1300a and 1300b may be configured as two sets of multiplexers, where one set provides inputs to 2N-M drive circuits 1324, 1328 and the other set provides inputs to M pre-emphasis drive circuits 1326, 1330. A total of 2N drive circuits is provided in each section. In the mid-level termination section 1300c, all 2N drive circuits are operated as a single set of 2N drive circuits 1332. The number N may be calculated such that 2N drive circuits provide a desired terminating impedance at the terminal 1316. In one example, each drive circuit of the sets of drive circuits 1324, 1326, 1328, 1330 and 1332 may be based on the output circuit 1120 shown in FIG. 11.

The pre-emphasis circuit 1300 may be operated synchronously, and driven by a clock signal 1308 that is derived from the system clock or from a transmitter clock, which may have a frequency that is a multiple of the symbol clock for the MIPI C-PHY interface. The same clock signal 1308 may be provided to or generated by the control logic 1314.

Figure 14:
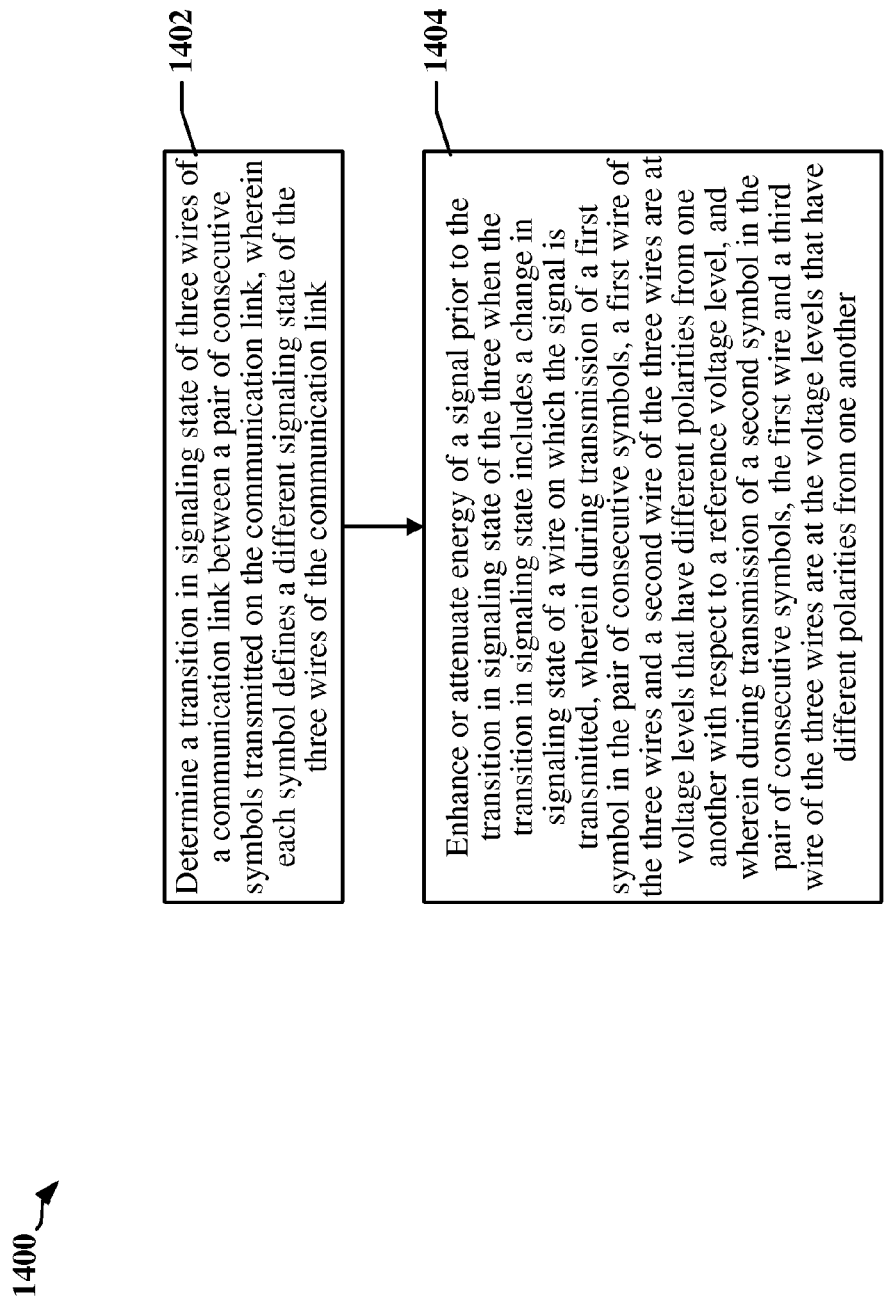
FIG. 14 is a flowchart illustrating an encoding method according to certain aspects of the invention.

FIG. 14 is a flowchart illustrating an encoding method according to certain aspects of the invention. The method may be performed by a device that transmits data on a MIPI C-PHY interface. At step 1402, the device may determine a transition in signaling state of three wires of a communication link between a pair of consecutive symbols transmitted on the communication link. Each symbol may define a different signaling state of the three wires of the communication link.

At step 1404, the device may enhance or attenuate energy of a signal prior to the transition in signaling state of the three wires when the transition in signaling state includes a change in signaling state of a wire on which the signal is transmitted. During transmission of a first symbol in the pair of consecutive symbols, a first wire of the three wires and a second wire of the three wires are at voltage levels that have different polarities from one another with respect to a reference voltage level. During transmission of a second symbol in the pair of consecutive symbols, the first wire and a third wire of the three wires are at the voltage levels that have different polarities from one another.

In one example, the reference voltage level is defined by the third wire during transmission of the first symbol and the reference voltage level is defined by the second wire during transmission of the second symbol.

In another example, the energy of the signal is enhanced when the transition in signaling state of the three wires includes a polarity change of the signal. The energy of the signal may be attenuated when the transition in signaling state of the three wires does not include a polarity change of the signal.

In another example, enhancing or attenuating the energy of the signal includes pre-emphasizing the signal by initiating the transmission of the second symbol before the transmission of the first symbol is terminated.

In another example, the signal has a maximum voltage range, and the energy of the signal is enhanced when the change in signaling state of the wire on which the signal is transmitted results in a swing in a difference voltage measured between two of the three wires that exceeds the maximum voltage range.

In another example, the energy of the signal is enhanced or attenuated based on signaling state of all three wires after the transition. The energy of the signal may be enhanced or attenuated based on changes in relative signaling states of each pairing of wires in the three wires. The energy of the signal may be enhanced or attenuated based on changes in the signaling state of all three wires. Enhancing or attenuating energy of a signal may include enabling or disabling a set of driver circuits coupled to the wire on which the signal is transmitted.

Figure 15:
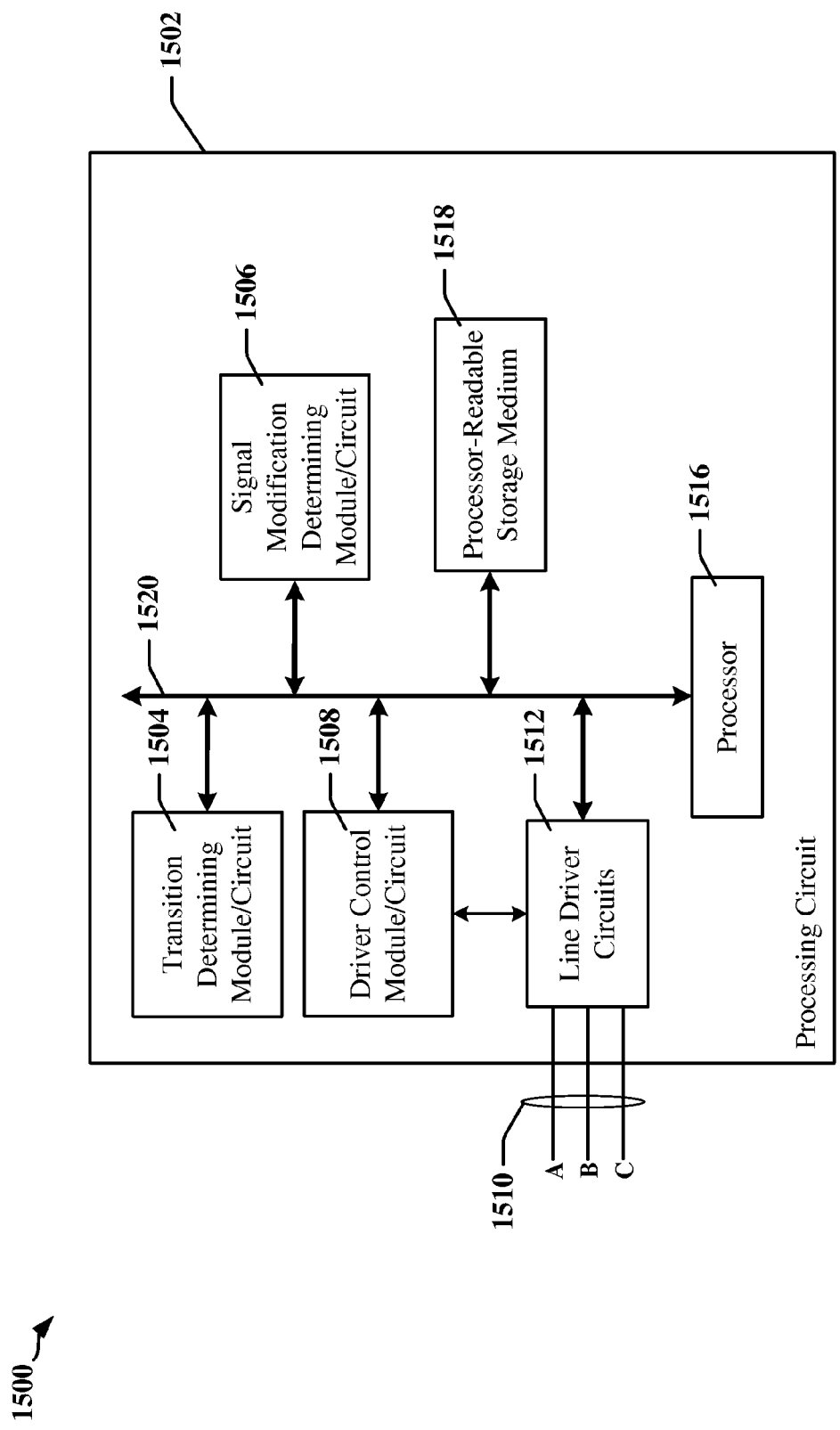
FIG. 15 illustrates one example of an apparatus configured to perform pre-emphasis in an encoder according to certain aspects of the invention.

FIG. 15 is a diagram illustrating a simplified example of a hardware implementation for an apparatus employing a processing circuit 1502. The processing circuit 1502 may be implemented with a bus architecture, represented generally by the bus 1520. The bus 1520 may include any number of interconnecting buses and bridges depending on the specific application of the processing circuit 1502 and the overall design constraints. The bus 1520 links together various circuits including one or more processors and/or hardware modules, represented by the processor 1516, the modules or circuits 1504, 1506, 1508, 1512 and the computer-readable storage medium 1518. The bus 1520 may also link various other circuits such as timing sources, peripherals, voltage regulators, and power management circuits, which are well known in the art, and therefore, will not be described any further. Line driver circuits 1512 may be coupled to one or more other modules 1504, 1506, 1508, and/or 1516 directly or through the bus 1520, and the line driver circuits 1512 may be configured to drive a 3-wire MIPI C-PHY interface (e.g., communication link 1510).

The processor 1516 may include a microprocessor, a controller, a digital signal processor, a sequencer, a state machine, etc. The processor 1516 is responsible for general processing, including the execution of software stored on the computer-readable storage medium 1516. The software, when executed by the processor 1516, causes the processing circuit 1502 to perform the various functions described supra for any particular apparatus. The computer-readable storage medium 1518 may also be used for storing data that is manipulated by the processor 1516 when executing software. The processing circuit 1502 further includes at least one of the modules 1504, 1506 and 1508. The modules 1504, 1506 and/or 1508 may include software modules running in the processor 1516, resident/stored in the computer readable storage medium 1518, one or more hardware modules coupled to the processor 1516, or some combination thereof.

In one configuration, the apparatus 1500 includes means 1504 for determining a transition in signaling state of three wires of a communication link 1510 between a pair of consecutive symbols transmitted on the communication link 1510, and means 1506, 1508 for enhancing or attenuating energy of a signal prior to the transition in signaling state of the three when the transition in signaling state includes a change in signaling state of a wire on which the signal is transmitted.

The aforementioned means may be implemented, for example, using some combination of a processor 206 or 236, physical layer drivers 210 or 240 and storage media 208 and 238.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for data communications, comprising:
    determining a transition in signaling state of three wires of a communication link between a pair of consecutive symbols transmitted on the communication link, wherein each symbol defines a different signaling state of the three wires of the communication link; and
    enhancing or attenuating energy of a signal prior to the transition in signaling state of the three wires when the transition in signaling state includes a change in signaling state of a wire on which the signal is transmitted,
    wherein during transmission of a first symbol in the pair of consecutive symbols, a first wire of the three wires and a second wire of the three wires are at voltage levels that have different polarities from one another with respect to a reference voltage level, and
    wherein during transmission of a second symbol in the pair of consecutive symbols, the first wire and a third wire of the three wires are at the voltage levels that have different polarities from one another.

2. The method of claim 1, wherein during transmission of the first symbol the reference voltage level is defined by the third wire and during transmission of the second symbol the reference voltage level is defined by the second wire.

3. The method of claim 1, wherein the energy of the signal is enhanced when the transition in signaling state of the three wires includes a polarity change of the signal.

4. The method of claim 1, wherein the energy of the signal is attenuated when the transition in signaling state of the three wires does not include a polarity change of the signal.

5. The method of claim 1, wherein enhancing or attenuating the energy of the signal includes pre-emphasizing the signal by initiating the transmission of the second symbol before the transmission of the first symbol is terminated.

6. The method of claim 1, wherein the signal has a maximum voltage range, and wherein the energy of the signal is enhanced when the change in signaling state of the wire on which the signal is transmitted results in a swing in a difference voltage measured between two of the three wires that exceeds the maximum voltage range.

7. The method of claim 1, wherein the energy of the signal is enhanced or attenuated based on signaling state of all three wires after the transition.

8. The method of claim 7, wherein the energy of the signal is enhanced or attenuated based on changes in relative signaling states of each pairing of wires in the three wires.

9. The method of claim 7, wherein the energy of the signal is enhanced or attenuated based on changes in the signaling state of all three wires.

10. The method of claim 7, wherein enhancing or attenuating energy of a signal includes enabling or disabling a set of driver circuits coupled to the wire on which the signal is transmitted.

11. An apparatus, comprising:
    means for determining a transition in signaling state of three wires of a communication link between a pair of consecutive symbols transmitted on the communication link, wherein each symbol defines a different signaling state of the three wires of the communication link; and
    means for enhancing or attenuating energy of a signal prior to the transition in signaling state of the three wires when the transition in signaling state includes a change in signaling state of a wire on which the signal is transmitted,
    wherein during transmission of a first symbol in the pair of consecutive symbols, a first wire of the three wires and a second wire of the three wires are at voltage levels that have different polarities from one another with respect to a reference voltage level, and
    wherein during transmission of a second symbol in the pair of consecutive symbols, the first wire and a third wire of the three wires are at the voltage levels that have different polarities from one another.

12. The apparatus of claim 11, wherein during transmission of the first symbol the reference voltage level is defined by the third wire and during transmission of the second symbol the reference voltage level is defined by the second wire.

13. The apparatus of claim 11, wherein the energy of the signal is enhanced when the transition in signaling state of the three wires includes a polarity change of the signal, and wherein the energy of the signal is attenuated when the transition in signaling state of the three wires does not include a polarity change of the signal.

14. The apparatus of claim 11, wherein the means for enhancing or attenuating the energy of the signal is configured to pre-emphasize the signal by initiating the transmission of the second symbol before the transmission of the first symbol is terminated.

15. The apparatus of claim 11, wherein the signal has a maximum voltage range, and wherein the energy of the signal is enhanced when the change in signaling state of the wire on which the signal is transmitted results in a swing in a difference voltage measured between two of the three wires that exceeds the maximum voltage range.

16. The apparatus of claim 11, wherein the energy of the signal is enhanced or attenuated based on signaling state of all three wires after the transition.

17. The apparatus of claim 16, wherein the energy of the signal is enhanced or attenuated based on changes in relative signaling states of each pairing of wires in the three wires.

18. The apparatus of claim 16, wherein the means for enhancing or attenuating energy of a signal is configured to enable or disable a set of driver circuits coupled to the wire on which the signal is transmitted.

19. An apparatus, comprising:
    a processing circuit configured to:
        determine a transition in signaling state of three wires of a communication link between a pair of consecutive symbols transmitted on the communication link, wherein each symbol defines a different signaling state of the three wires of the communication link; and
        enhance or attenuate energy of a signal prior to the transition in signaling state of the three wires when the transition in signaling state includes a change in signaling state of a wire on which the signal is transmitted,
    wherein during transmission of a first symbol in the pair of consecutive symbols, a first wire of the three wires and a second wire of the three wires are at voltage levels that have different polarities from one another with respect to a reference voltage level, and
    wherein during transmission of a second symbol in the pair of consecutive symbols, the first wire and a third wire of the three wires are at the voltage levels that have different polarities from one another.

20. The apparatus of claim 19, wherein during transmission of the first symbol the reference voltage level is defined by the third wire and during transmission of the second symbol the reference voltage level is defined by the second wire.

21. The apparatus of claim 19, wherein the energy of the signal is enhanced when the transition in signaling state of the three wires includes a polarity change of the signal, and wherein the energy of the signal is attenuated when the transition in signaling state of the three wires does not include a polarity change of the signal.

22. The apparatus of claim 19, wherein the processing circuit is configured to pre-emphasize the signal by initiating the transmission of the second symbol before the transmission of the first symbol is terminated in order to enhance or attenuate the energy of the signal.

23. The apparatus of claim 19, wherein the signal has a maximum voltage range, and wherein the energy of the signal is enhanced when the change in signaling state of the wire on which the signal is transmitted results in a swing in a difference voltage measured between two of the three wires that exceeds the maximum voltage range.

24. The apparatus of claim 19, wherein the energy of the signal is enhanced or attenuated based on changes in signaling state of all at least two wires after the transition.

25. A non-transitory processor-readable storage medium having one or more instructions which, when executed by at least one processing circuit, cause the at least one processing circuit to:
determine a transition in signaling state of three wires of a communication link between a pair of consecutive symbols transmitted on the communication link, wherein each symbol defines a different signaling state of the three wires of the communication link; and
enhance or attenuate energy of a signal prior to the transition in signaling state of the three when the transition in signaling state includes a change in signaling state of a wire on which the signal is transmitted,
wherein during transmission of a first symbol in the pair of consecutive symbols, a first wire of the three wires and a second wire of the three wires are at voltage levels that have different polarities from one another with respect to a reference voltage level, and
wherein during transmission of a second symbol in the pair of consecutive symbols, the first wire and a third wire of the three wires are at the voltage levels that have different polarities from one another.

26. The non-transitory storage medium of claim 25, wherein during transmission of the first symbol the reference voltage level is defined by the third wire and during transmission of the second symbol the reference voltage level is defined by the second wire.

27. The non-transitory storage medium of claim 25, wherein the energy of the signal is enhanced when the transition in signaling state of the three wires includes a polarity change of the signal, and wherein the energy of the signal is attenuated when the transition in signaling state of the three wires does not include a polarity change of the signal.

28. The non-transitory storage medium of claim 25, further comprising instructions that cause the at least one processing circuit to:
pre-emphasize the signal by initiating the transmission of the second symbol before the transmission of the first symbol is terminated in order to enhance or attenuate the energy of the signal.

29. The non-transitory storage medium of claim 25, wherein the signal has a maximum voltage range, and wherein the energy of the signal is enhanced when the change in signaling state of the wire on which the signal is transmitted results in a swing in a difference voltage measured between two of the three wires that exceeds the maximum voltage range.

30. The non-transitory storage medium of claim 25, wherein the energy of the signal is enhanced or attenuated based on signaling state of all three wires after the transition.

\* \* \* \* \*